June 27, 1961  P. A. ARGENTIERI ET AL  2,989,984
DUAL DUCT ATTENUATORS FOR AIR CONDITIONING
SYSTEMS AND THE LIKE Filed Nov. 20, 1957  4 Sheets-Sheet 3

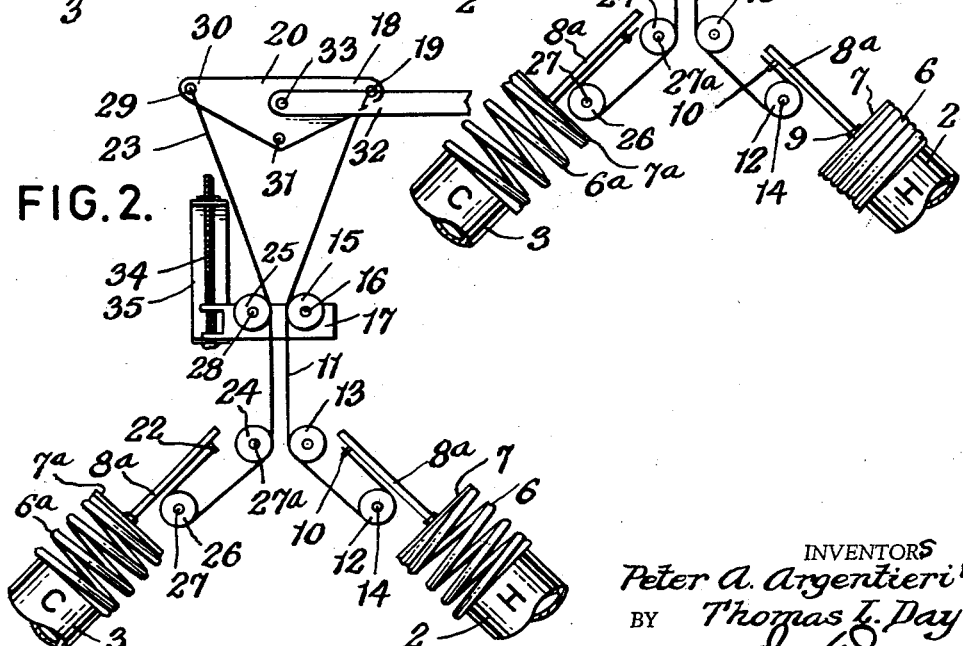

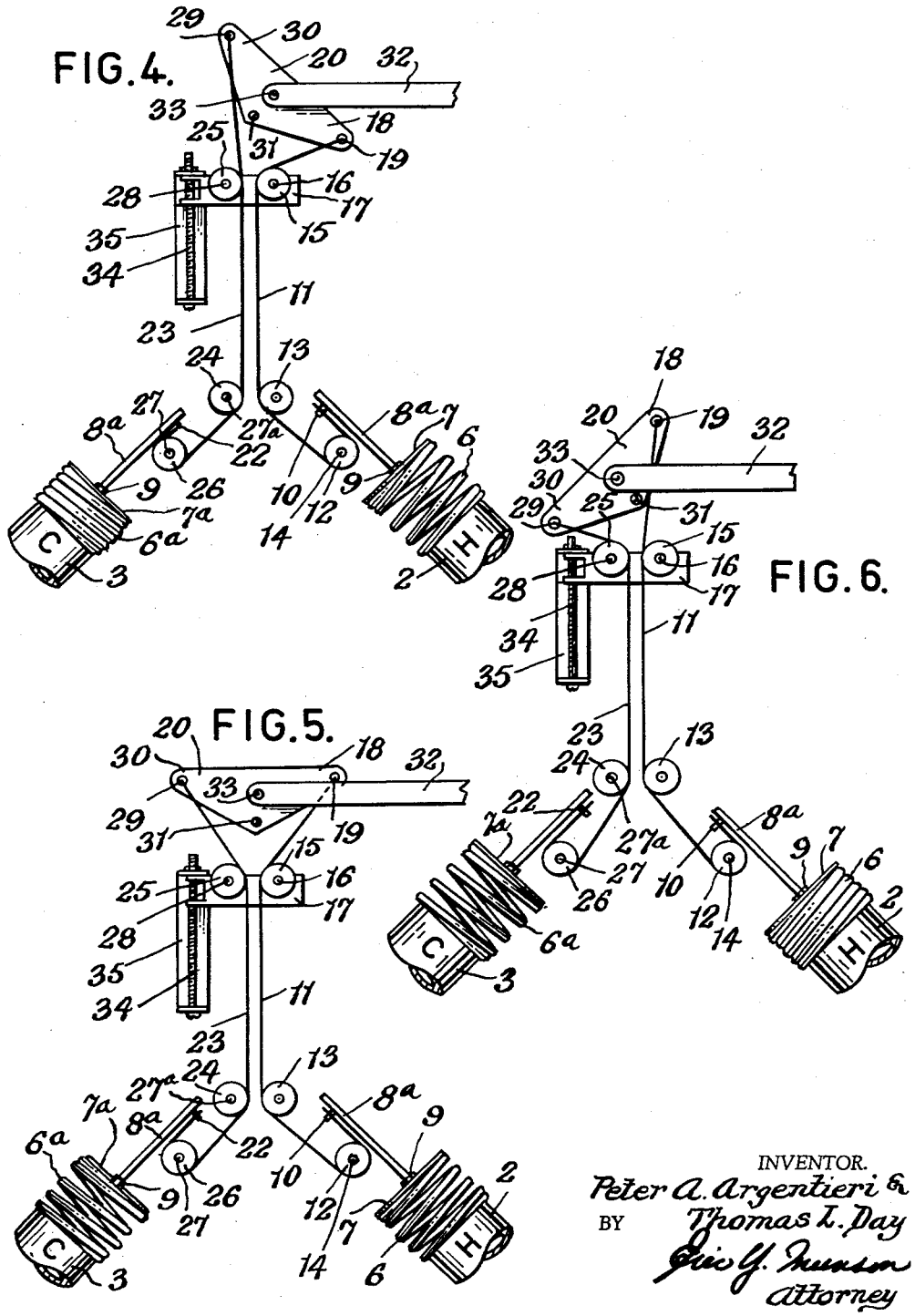

INVENTOR.
Peter A. Argentieri &
BY Thomas L. Day

Attorney

United States Patent Office 2,989,984
Patented June 27, 1961

2,989,984
DUAL DUCT ATTENUATORS FOR AIR CONDITIONING SYSTEMS AND THE LIKE
Peter A. Argentieri, Danbury, and Thomas L. Day, Bethel, Conn., assignors to Connor Engineering Corporation, Danbury, Conn., a corporation of New York
Filed Nov. 20, 1957, Ser. No. 697,705
6 Claims. (Cl. 137—607)

This invention relates to air-conditioning systems and more particularly to dual duct attenuators for use therein, and a primary object of the present invention is to provide an accurate and simple means for controlling the flow and temperature of the air from such devices. The invention has particular reference to a type of air-flow controlling device, such as is shown in Patent No. 2,749,831, dated June 12, 1956, and issued to Argentieri, Daninhirsch and Day, and relates to improvements in the structure therein shown.

A dual valve attenuator performs the primary function of taking heated air from one duct and cool air from another duct and mixing these two air streams to attain the required air temperature to properly condition the space which it serves. Therefore, the hot air damper and the cold air damper of the valve attenuator must operate in opposition so that as one damper reduces the quantity of air admitted by its duct the other damper will increase the quantity of air admitted through the other duct. Thus, the temperature of the mixture will be varied anywhere between the temperatures of the hot and cold air streams. In addition to this, the two dampers must be capable of simultaneous adjustment to restrict the total volume of air handled by the valve attenuator. In this manner, the device may be adjusted to admit the proper total quantity of air to the space. Also, when the dampers are so adjusted for total volume, the travel of the control element which operates the dampers in opposition to modulate the temperature, should remain constant. Furthermore, the static pressures at the inlets to a dual duct valve attenuator vary as the dampers operate to change the proportion of hot and cold air admitted. Therefore, it is desirable to have a device which will tend to compensate for this variance in inlet static pressure.

It is one of the objects of the invention to provide a control means for dual duct valve attenuators which will satisfy all of the above requirements in a far simpler and more effective manner than has heretofore been possible.

More particularly, the invention contemplates the provision of a mixing chamber into which ducts carrying air at different temperatures enter. At the point where the ducts enter the mixing chamber, dampers are provided which, in the embodiment described, are composed of helical members which may be compressed or allowed to expand. It is obvious that such compression or expansion will vary the free area between the convolutes of these helical members thereby regulating the amount of air introduced into the mixing chamber through either or both of these helical members.

Another object of the invention is to provide a simple control means to properly operate the helical members so that all of the requirements of ideal dual duct valve attenuators will be met. This control means is a simple arrangement of pulleys and cables attached to a simple linkage.

With these and other objects to be hereinafter set forth in view, we have devised the arrangement of parts to be described and more particularly pointed out in the claims appended hereto.

In the accompanying drawings, wherein an illustrative embodiment of the invention is disclosed.

FIG. 1 is a view showing the improved dual duct valve attenuator mechanism, with the parts in position wherein one of the dampers is fully open and the other is fully closed and adjusted for maximum total volume;

FIG. 2 is a similar view, but showing both of the dampers in partly-open position;

FIG. 3 is a similar view to FIG. 1, but showing the opposite dampers fully open and fully closed;

FIG. 4 shows the position of the mechanism with one damper partly open and the second damper fully closed, but adjusted for less than maximum total volume;

FIG. 5 is a view similar to FIG. 4 but showing the opposite dampers partly open and fully closed;

FIG. 6 is a view similar to FIG. 4 but showing the opposite dampers fully opened and fully closed;

Figure 7:
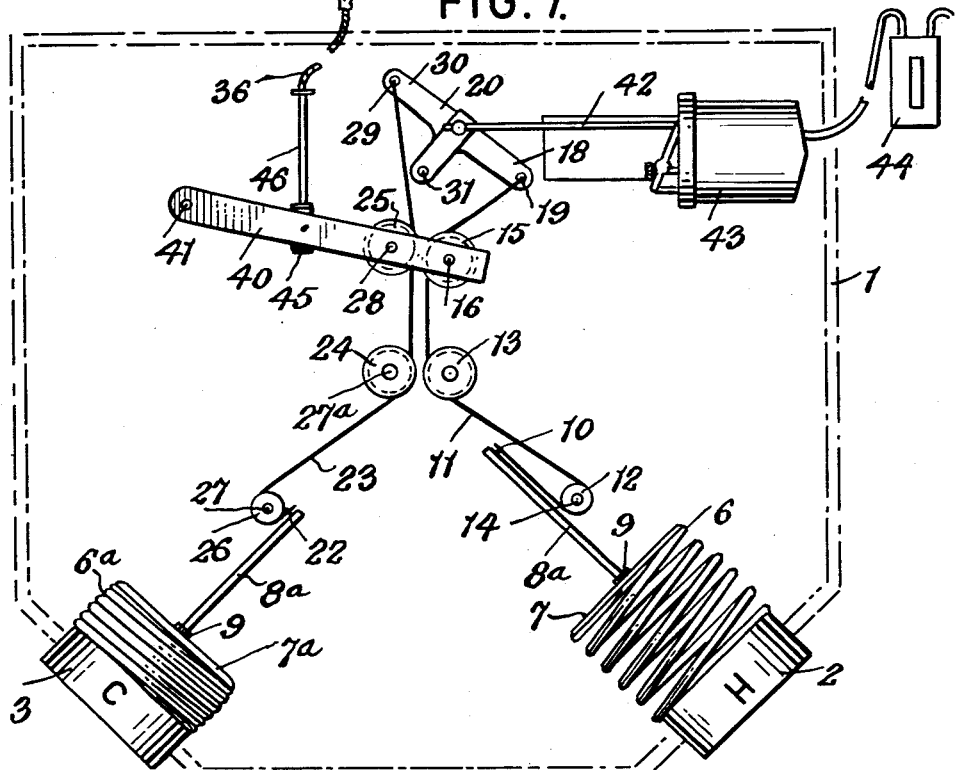
FIG. 7 shows a slightly modified mechanism.

Referring to the drawings, reference numeral 1 in FIG. 1 indicates generally a housing or air-mixing chamber into which a pair of inlet collars, indicated respectively at 2 and 3, and suitable for connection to air ducts, enter for the conveyance of air streams of different temperatures into the chamber 1 for mixture therein and for flow out through an outlet suitably provided in the housing of chamber 1 as indicated. The collar, indicated at 3 conveys the cool air, as indicated by the letter "C" while the collar shown at 2 conveys the warm or hot air as indicated by the letter "H." The housing may be composed of sheet metal and it is preferably lined with an insulating lining of sound-absorbent material, as indicated at 5 in FIG. 8.

Figure 8:
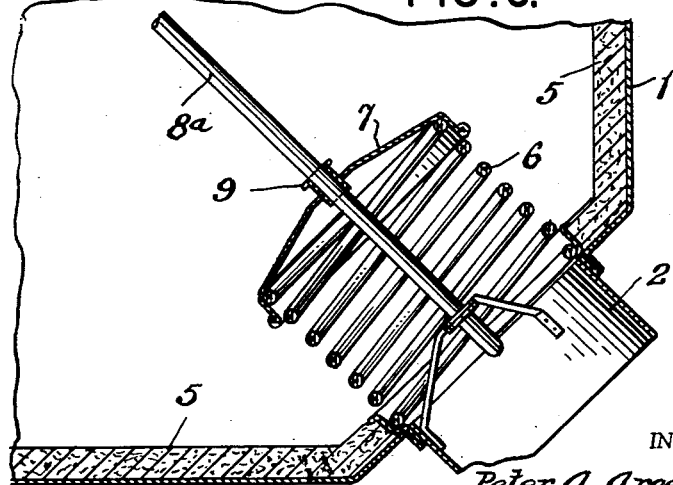
FIG. 8 is a detail view showing one of the inlet collars and the damper associated with the same, and the mounting for the inlet collar.

Each of the collars 2 and 3 is connected to a springy helical member as shown at 6 and 6a, which members constitute dampers that can be adjusted, as shown at the right in FIG. 1 for example, to allow the passage of air between its convolutes and then into the interior of the mixing chamber 1. The extent to which the convolutes of the helical members are separated determines the amount of air that is passed into the mixing chamber within a given period. When the convolutes of the helical member are in intimate contact, as shown by the helical member 6a in FIG. 1, the inlet 3 will be closed, since no air can then pass between the convolutes and the end of each of the helical members 6 and 6a is closed by a disk-shaped cap (FIG. 8). The cap shown at 7 closes the end of the inlet 2, while that shown at 7a closes the end of the inlet 3. Each of the caps 7 and 7a is attached to a rod 8a by a ferrule 9 so that a longitudinal movement of the rod 8a will exert a push on the cap 7 or 7a and compress the convolutes of the helical member.

Secured to the rod 8a that is attached to the cap 7 is a pin 10 to which one end of a flexible cable 11 is fastened. Said cable 11 extends around a rotatable roller or pulley 12 located on a fixed axis 14 and the cable then passes around a pulley 13 also rotative around a fixed axis. The position of the pulley 12 permits tension on the cable 11 to close the damper 6. The cable 11 then extends over a pulley 15, rotative on its axis 16 projecting from a movable or adjustable arm 17. After passing pulley 15, the cable 11 extends and is secured to one of the arms 18 of a bell-crank 20, as indicated at 19.

The rod 8a that is secured to the closure plate or cap 8 has a pin 22 located near its free end, and fastened to said pin is one end of a cable 23 which extends around a pulley 26 rotative on a fixed axis, as shown at 27. Cable 23 also extends around a guide pulley 24 on a fixed axis 27a and then extends to and engages pulley 25 located on an axis 28 provided on the arm 17. The second end of the cable 23 is secured at 29 to the second arm, or that indicated at 30, of the bell-crank 20.

The bell-crank 20 is pivotally mounted at 31 on a fixed element within the housing 1 and is capable of a rocking movement on its pivot 31 to thereby open or close or partly open or close the helical members or dampers 6 and 6a in a manner to be described. For pivotally moving the bell-crank 20, a link 32 has one end pivotally secured at 33 to the bell-crank, eccentrically of the pivot 31 so that any back-and-forth movement of the link 32 will serve to rock the bell-crank and will cause the dampers to be opened or closed as desired through the cables 11 and 23 in a manner to be described.

The extent to which the helical members or dampers 6 and 6a will be extended or opened to permit of the passage of air into the housing 1, is determined by the effective length of the cables 11 and 23 and that is regulated by the position of the arm 17 carrying the pulleys 15 and 25. The arm 17 may be moved by means of its threadable engagement with a threaded rod 34 rotative in a bracket 35. This adjustment may be made from the outside of the mixing chamber or housing 1 in any suitable manner, such as by means of a flexible cable attached to rod 34 and terminating in a knob positioned externally of the housing 1. It will be apparent that by rotating the rod 34, the arm 17, with the pulleys 15 and 25 carried by it, will be raised or lowered according to the direction of movement of the rod 34, and the effective lengths of the cables 11 and 23 shortened or lengthened accordingly.

By reference to FIGS. 1 to 6 inclusive, the operation of the described apparatus will be apparent. In FIG. 1, which may be considered as the starting position, the inlet 2 has its damper or helical member 6 in fully open position so that hot air is being caused to flow between the convolutes of the coil 6 to enter into the mixing chamber 1. At this time, the spiral member of damper 6a is fully closed so that no cool air is entering into the mixing chamber. The arm 17 is in its lowered position so that the pulleys 15 and 25 are also lowered.

In FIG. 2 the bell-crank has been rocked to a central position, with the result that both the helical members or dampers 6 and 6a are opened to an equal extent, but neither of the dampers is fully opened. At this time, equal volumes of hot and cool air are entering into the mixing chamber. It will be noted that the arm 17 and hence the pulleys 15 and 25 remain in lowered position. When both dampers are partly open as shown in FIG. 2 the increase in air volume that would take place if both dampers were fully open is counteracted. The dampers 6 and 6a being thus only partly open, not only control the temperature of the air flow, but the volume as well.

In FIG. 3, the bell-crank 20 has been rocked toward the left and to its limit of movement in that direction, causing the damper or helical member 6a to become fully open while the damper 6 is fully closed. In this position cold air is being admitted into the mixing chamber while the flow of hot air is being shut off.

Referring now to FIG. 4, it will be noted that the bell-crank 20 has been swung back to the position shown in FIG. 1, but in FIG. 4, the arm 17 and the pulleys 15 and 25 have been raised. Thus, while the parts here are shown substantially the same as in FIG. 1, with hot air being supplied and cold air being shut off, due to the raised position of the pulleys 15 and 25, the helical member or damper 6 has been opened to a lesser extent than shown in FIG. 1 so that a lesser amount of hot air is being admitted into the mixing chamber.

In FIG. 5 is shown a view similar to FIG. 2, except that in FIG. 5 the arm 17 is also elevated, with the result that both of the helical members or dampers 6 and 6a have been opened but to a lesser extent than is shown in FIG. 2. FIG. 6 is a similar view to FIG. 3, but since the arm 17 is in its raised position, the cold air damper 6a is opened to a lesser extent than shown in FIG. 3. It will be understood that when no pull is exerted on the cables 11 and 23 the springiness of the helical members 6 and 6a will cause them to open, aided by the force exerted by the supplied air.

From the arrangement described, it will be apparent that control of the dampers may be readily effected in a manner to allow either hot or cool air or both to enter the mixing chamber, with control of the quantity of air effected by movement of the arm 17.

In the embodiment of the invention shown in FIG. 7, a structure similar in most respects to that shown in FIGS. 1 to 6 inclusive is disclosed. In the structure of FIG. 7 is shown a lever 40, pivoted at one end, as indicated at 41; and carrying the two pulleys shown respectively at 15 and 25 adjacent to its opposite end. The lever 40 is thus the equivalent of the arm 17. In this embodiment of the invention, the bell-crank 20 is connected by a rod 42 to a hydraulic or pneumatic motor 43, the operation of which may be controlled by a thermostatic control 44, and which is effective to move the rod 42 in either direction to cause movement of the cables 11 and 23 to open or close the dampers 6 and 6a as described in the previous embodiment of the invention. The lever 40 is pivotally connected to a movable bracket 45 threadably mounted on a threaded rod 46 connected to a flexible cable 36 which can terminate in a knob located exteriorly of the housing or mixing chamber 1.

A linkage mechanism can be arranged to operate linearly, that is, in such a manner that the total open area of the two dampers will remain constant regardless of the amount that either damper is open. If this is done, the volume of air handled by the valve attenuator will remain constant provided inlet static pressures remain constant. However, such is not the case. As will be shown below, inlet static pressures are always higher when the dampers are in the mid-position than when either is fully open so their function is continuous. Therefore, the linkage in this construction is designed in such a manner that the total open damper area is less in the mid-position in order to compensate for the variations in static pressure.

It will be understood from the foregoing that the operation of the dampers is controlled by flexible cords in tension. Tightening each cord will commence to close its damper until a point of complete closure has been reached. Loosening each cord will open its damper. Because of direct tensile connections the damper movement is exactly equal to the linear movement of the cord.

The effect of the damper movement on degree of dampering achieved is very close to a straight line relationship, called "linear dampering," as test data bears out. That is, a damper handling 100% air when fully open, will handle 50% when half open; 25% when one-quarter open, etc. for constant inlet static pressures. Thus, the combined effect is a nearly linear dampering for linear cord movement. It will be understood that to combine operation of the two dampers, to mix the cold and hot air, the total air volume should be substantially constant while the mixture ratio may be varied from all hot air supply to all cold air supply.

Assume dampers oppositely linked in a linear manner and a typical condition with a constant main duct air supply pressure of 2.0" water gauge. The inlet friction loss in pressure from main duct to mixing valve will vary with the square of the air velocity. Since the connecting duct work is unchanging, this inlet friction also varies with the square of the air volume. Let us assume a value of 1.0" water gauge friction loss for the extreme condition of all air flowing through one side. Below is a calculated tabulation of five conditions of mixture.

| Condition | I | II | III | IV | V |
|---|---|---|---|---|---|
| Main Supply pressure | 2.0 | 2.0 | 2.0 | 2.0 | 2.0 |
| Hot Damper setting | Full open | ¾ open | ½ open | ¼ open | Closed |
| Hot Inlet Friction loss | 1.0 | .72 | .40 | .12 | 0 |
| Hot Air Damper pressure | 1.0 | 1.28 | 1.60 | 1.82 | 2.0 |
| Hot Air Volume | 100% | 85% | 63% | 34% | 0 |
| Cold Damper Setting | Closed | ¼ open | ½ open | ¾ open | Full Open |
| Cold Inlet Friction loss | 0 | .12 | .40 | .72 | 1.0 |
| Cold Air Damper pressure | 2.0 | 1.88 | 1.60 | 1.28 | 1.0 |
| Cold Air Volume | 0 | 34% | 63% | 85% | 100% |
| Total Air Volume | 100% | 119% | 126% | 119% | 100% |

Result: An increase of 26% volume in the mid-position of mixing. It will be seen that the linkage according to the invention adjusts the dampers so that approximately 30% more static pressure at the mid-position is required for a flow volume equal to that at the fully open and fully closed positions. Thus in the example given above 1.3" static pressure would be required for 100% volume at the mid-position instead of 1" as shown for a linear linkage. The increase in air volume would then be reduced to an 11% increase instead of to a 26% increase as shown. This can be tolerated since the examples above show an extreme condition.

It will furthermore be understood from the foregoing specification, that this invention will fulfill the following requirements:

(1) Operate from the position of hot damper closed while cold damper is open to the opposite position of cold damper closed while hot damper is open. Thus from a fixed thermostatically controlled motor stroke the linkage can operate in a range limited by one closed damper position to the other closed damper position regardless of the amount of damper opening required for the desired volume.

(2) The volume adjustment, or means to regulate the amount of damper opening, does not affect the ability of each damper to attain the fully closed position at the extreme end of the operating movement.

(3) The friction of the operating movement is maintained extremely low so that the linkage will respond to even small changes in motor pressure from the modulating thermostat, and the operating movement is assisted by the toggle action of the T element at the closed positions of the dampers.

(4) The characteristic response of the linkage is not linear but it should furnish less total damper opening in mid-mixing positions than at each end of the movement. Thus the increase in air volume at mid points mentioned above will be counteracted.

It will be clear from the foregoing that the invention provides a simple means to adjust the dampers both in an opposed fashion and in a simultaneous fashion. The adjustment of the dampers in a simultaneous fashion results in the reduction of the total air volume and at the same time there is the mechanical ratio between the damper movement and the movement of the T-member in exact proportion so that the T-member always operates through the same distance regardless of the maximum amount of openings in the dampers.

Figure 9:
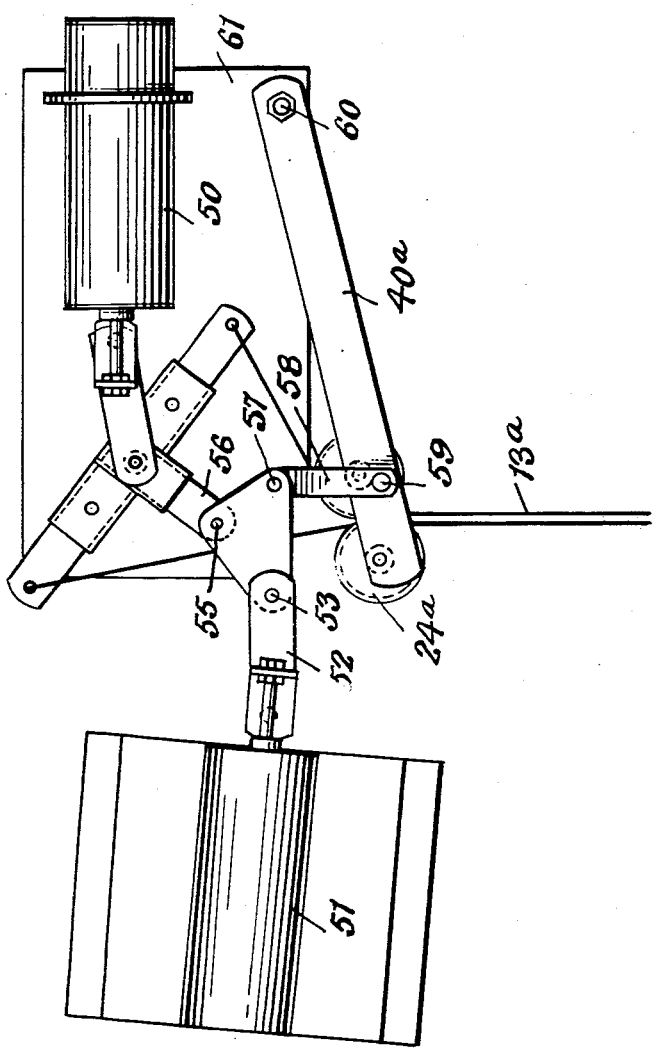
FIG. 9 shows a modified construction.

In the embodiments of the invention shown in FIG. 9, two motors, indicated respectively at 50 and 51 are employed. That shown at 50 is connected to link 32a having its end connected to the pivot 33a. The motor shown at 51 adjusts the air volume and is controlled by a pressure response device which regulates the air volume flowing into the chamber. Thus, volume control is achieved regardless of static friction in the unit.

In this embodiment motor 51 is connected at 53 by link 52 to one end of a triangulated link 54, another end of said link being connected at 55 to the central arm 56 of the T-shaped lever 20a. The third end of triangular link 54 connects at 57 to link 58 having its lower end connected at 59 to lever 40a, pivoted at one end, as indicated at 60 on a fixed support 61. Lever 40a carries the pulleys 24a and 13a over which the cables 23 and 11, leading from the arms of the T-shaped lever 20a extend. Through this arrangement, motor 51 will operate to raise or lower the lever 40a, thus functioning automatically according to a pressure response device of known kind connected to motor 51.

It should be understood that the foregoing description has been given by way of example only and not by way of restriction. On the other hand, the invention lends itself to a variety of expressions within the scope of the following claims.

What we claim is:

1. A dual duct valve attenuator comprising, a housing at which a pair of air ducts is terminated, each duct termination including a spring-urged damper located within the housing and adjusted by varying the open area between it and its duct, flexible cables attached to said dampers, an adjustable linkage operative to move the cables in an opposed manner to cause opening of one damper and closing movement of the other, said adjusting linkage including a pivoted T-element, the cables being attached to the arms of the T-element so that oscillation of the T-element pulls one cable for a predetermined distance while permitting the other cable to be simultaneously pulled in the opposite direction for the same distance, and means for moving the cables in a direction toward the center of oscillation of the T-member so that the cables simultaneously reduce the maximum amount of opening of the dampers and the amount of travel of the dampers relative to the movement of the T-element.

2. In a dual duct valve attenuator as provided for in claim 1, wherein the means for moving the cables towards the center of oscillation of the T-member consists of a plurality of pulleys engaged by the cables and which pulleys are movable relatively to said center of oscillation.

3. A dual duct attenuator as provided for in claim 1, wherein the means for moving the cables in a direction toward the center of oscillation of the T-member consists in a pair of pulleys over which the cables extend, an adjustable element on which the pulleys are mounted and means for shifting said element to thereby simultaneously move both pulleys for the same distance.

4. A dual duct valve attenuator comprising, a housing at which a pair of air ducts is terminated, each duct termination including a spring-urged damper located within the housing and adjusted by varying the open area between it and its duct, flexible cables attached to said closing means and connected to an adjustable linkage, said linkage including a pivoted element having arms to which one end of each cable is attached, means for pivotally moving said pivotal element, pulleys situated between said movable element and over which the cables extend, and means by which one pulley for each cable is adjustable to and from the pivotal point of the pivoted element to thereby shorten or lengthen the effective length of the cables.

5. A dual duct valve attenuator comprising, a housing at which a pair of air ducts is terminated, each duct termination including a damper located within the housing and adjusted by varying the spacing between it and its duct, flexible cables attached to said adjusting means, an adjustable linkage operative to move the cables in an opposed manner to cause opening of one damper and closing movement of the other, said adjusting linkage including a pivoted T-element, the cables being attached to the arms of the T-element so that oscillation of the T-element pulls one cable for a predetermined distance while permitting the other cable to be simultaneously pulled in the opposite direction of the same distance, means for moving the cables in a direction toward the center of oscillation of the T-member so that the cables simultaneously reduce the maximum amount of opening of the dampers and the amount of travel of the dampers relative to the movement of the T-element, the T-member being so proportioned that when both the cables and dampers are in their mid-position the total amount of opening of the dampers will be less than the total amount of opening attained when either damper is fully open while the other damper is fully closed.

6. A dual duct valve attenuator comprising, a housing, a pair of spaced-apart duct communicating with the interior of the housing, each duct including a spiral damper located within the housing and adapted by the spacing of its convolutes to determine the amount of air passed through it, each damper being closed at one end by a disk-shaped closure, a cable having an end attached to said closure, a plurality of pulleys over which each cable is guided, some of the pulleys being rotative on fixed axes and other pulleys on movable axes, the shifting of the axes of the latter pulleys causing shortening or lengthening of the effective lengths of the cables, a bell-crank pivotally mounted remotely from the dampers, each arm of the bell-crank being connected to an end of a cable, means connected to the bell-crank for rocking the bell-crank in a manner to cause a pull to be exerted on one or the other of the cables to cause said cable to permit of expansion of the damper to which it is attached and thus increase the spacing between the convolutes of said damper.

References Cited in the file of this patent

UNITED STATES PATENTS

| | | |
|---|---|---|
| 1,246,355 | Thomas | Nov. 13, 1917 |
| 2,108,225 | Johnson | Feb. 15, 1938 |
| 2,620,983 | Lyman | Dec. 9, 1952 |
| 2,710,724 | McMahon | June 14, 1955 |
| 2,793,812 | McDonald | May 28, 1957 |
| 2,814,446 | Phillips et al. | Nov. 26, 1957 |
| 2,821,343 | Payne | Jan. 28, 1958 |
| 2,830,765 | Beller | Apr. 15, 1958 |

FOREIGN PATENTS

| | | |
|---|---|---|
| 1,111,141 | France | Oct. 26, 1955 |
| 2,600 | Great Britain | 1915 |
| 253,317 | Great Britain | June 17, 1926 |